United States Patent [19]
Mitchell

[11] Patent Number: 5,174,534
[45] Date of Patent: Dec. 29, 1992

[54] CONTAINER ADAPTER

[76] Inventor: Robert L. Mitchell, 1104 Birch St., Hurst, Tex. 76053

[21] Appl. No.: 765,595

[22] Filed: Sep. 26, 1991

[51] Int. Cl.⁵ .............................................. A47K 1/08
[52] U.S. Cl. .............................. 248/311.2; 215/100 R; 224/42.45 R
[58] Field of Search ................. 248/146, 311.2, 346.1, 248/188.5, 912; 220/737; 215/100 R; 211/71, 74; 224/42.45 R, 42.42, 295

[56] References Cited

U.S. PATENT DOCUMENTS

| | | | |
|---|---|---|---|
| 2,912,202 | 11/1959 | Petrick | 248/188.5 X |
| 2,982,982 | 5/1961 | Swift, Sr. | 248/311.2 X |
| 4,040,549 | 8/1977 | Sadler | 248/311.2 X |
| 4,069,996 | 1/1978 | Koziol | 248/912 X |
| 4,127,211 | 11/1978 | Zerbey | 248/346.1 X |
| 4,613,048 | 9/1986 | McGill | 211/71 |
| 4,721,216 | 1/1988 | Kinder | 220/737 X |
| 4,844,400 | 7/1989 | Jasmagy, Jr. | 248/311.2 |
| 4,854,468 | 8/1989 | Dahlquist, II et al. | 248/346.1 X |
| 5,022,549 | 6/1991 | Beaver | 248/146 X |
| 5,088,673 | 2/1992 | Chandler | 248/311.2 |

Primary Examiner—Carl D. Friedman
Assistant Examiner—Derek J. Berger
Attorney, Agent, or Firm—W. Kirk McCord

[57] ABSTRACT

An adapter is provided for adapting a container holder to support a container, such as beverage container, in a substantially upright position. The adapter includes a first adapter member, which is insertable into a receptacle in the container holder and a second adapter member, which is adapted for mating engagement with both the first adapter member and the container to support the container in a substantially upright position. The first adapter member is configured for snug fit mating engagement with the receptacle. The second adapter member includes a bottom portion configured for snug fit mating engagement with the first adapter member and a top portion configured for snug fit mating engagement with the container. In the preferred embodiment, the adapter cooperates with a beverage container holder having a cylindrical receptacle for supporting beverage containers of various sizes and shapes in a relatively stable upright position.

10 Claims, 4 Drawing Sheets

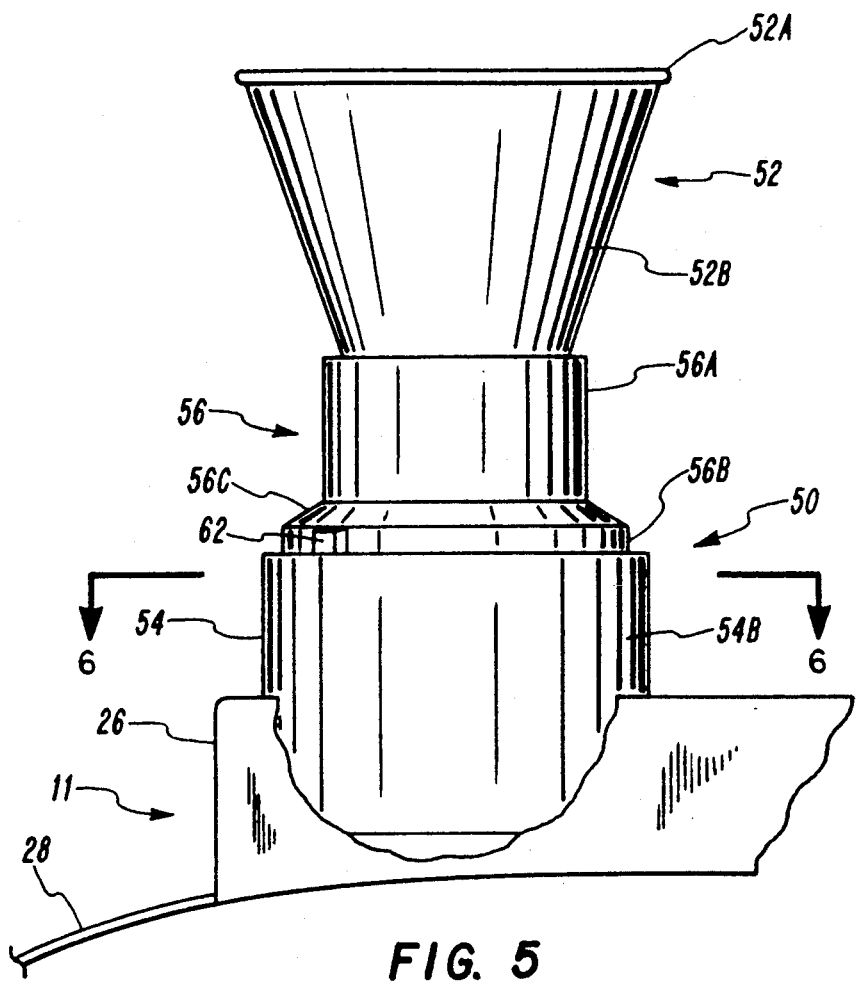
FIG. 5
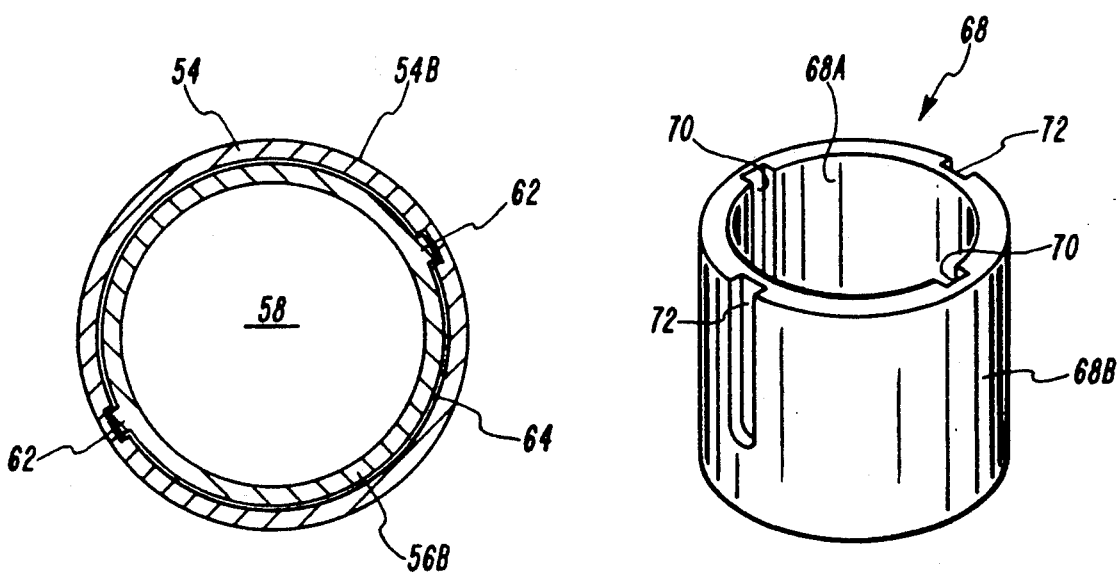
FIG. 6
FIG. 7

5,174,534

CONTAINER ADAPTER

FIELD OF INVENTION

This invention relates generally to food and beverage containers and in particular to a device for adapting food and beverage containers of various sizes to be retained by a standard sized container holder.

BACKGROUND OF THE INVENTION

Container holders are often used in automobiles to retain a food or beverage container in a substantially upright position so that the driver's hands are free to grasp the automobile steering wheel. The container holder typically includes a tray adapted to sit on the floor or seat of the automobile, with at least one substantially cylindrical receptacle for receiving a substantially cylindrical bottom portion of a food or beverage container. The tray may include a curved base portion adapted to fit over the curved raised portion on the floor of the automobile, which accommodates the automobile drive shaft in rear wheel drive automobiles.

One problem associated with such container holders is that many food and beverage containers do not fit properly within the receptacle. If the outside diameter of the container is substantially smaller than the inside diameter of the receptacle, the container will not be retained in a substantially upright position, which may result in excessive tilting of &he container and spillage of the contents thereof. On the other hand, if the outside diameter of the container is substantially greater than the inside diameter of the receptacle, the container cannot be inserted into the receptacle.

There is therefore a need for a container holder which is adaptable for retaining food and beverage containers of various sizes in a substantially upright position.

DISCLOSURE OF THE INVENTION

In accordance with the present invention, an adapter is provided for adapting a container to be retained by a container holder having a receptacle. The adapter includes a first adapter member adapted for snug fit engagement with the receptacle such that a portion of the first adapter member extends above the receptacle, and a second adapter member having a first portion which is adapted to matingly engage the first adapter member an a second portion which is adapted to matingly engage the container. The container is retained in a substantially upright position when the first adapter member is in snug fit engagement with the receptacle and with the first portion of the second adapter member and the second portion of the second adapter member is in mating engagement with the container. In accordance with a unique feature of the invention, a male member is located on one of the first and second adapter members and a female member is located on the other one of the first and second adapter members for engaging the male member to locate the first adapter member with respect to the second adapter member.

In one embodiment, the male member is a rib member projecting from an inner surface of the first portion of the second adapter member. The second adapter member preferably includes a plurality of rib members. The female member is an elongated slot formed in an outer surface of the first adapter member. The elongated slot is adapted to receive the rib member in mating engagement. The number of slots in the outer surface of the first adapter member corresponds to the members of rib numbers on the inner surface of the second adapter member so that each rib member is received within a corresponding slot.

In another embodiment, the male member is a rib members located on an outer surface of the first adapter member. The female member is an elongated slot located on an inner surface of the first portion of the second adapter member. The elongated slot is adapted to receive the rib member to locate the second adapter member with respect to the first adapter member. The first adapter member preferably includes a plurality of rib members. A plurality of slots may be formed on the inner surface of the first portion of the second adapter member to accommodate the corresponding plurality of rib members on the outer surface of the first adapter member.

In the preferred embodiment, the adapter according to the present invention is used to adapt a substantially cylindrical container, such as a typical beverage container, to be retained in a substantially upright position. The first adapter number is substantially cylindrical and has an outside diameter which is somewhat smaller than an inside diameter of a substantially cylindrical receptacle such that the first adapter member fits snugly within the receptacle with a portion of the first adapter member extending above the receptacle. The second adapter member has first and second substantially cylindrical portions.

If the outside diameter of the container is substantially greater than the inside diameter of the receptacle, the inside diameter of the first portion of the second adapter member is somewhat larger than the outside diameter of the first adapter member such that the first adapter member can be received within the first portion of the second adapter member in mating engagement. The second portion of the second adapter member is enlarged with the respect to the first portion thereof to accommodate the container. The inside diameter of the second portion of the second adapter member is somewhat larger than the outside diameter of the container such that the container can be received within the second portion of the second in adapter member in mating engagement.

At least one notch is formed in the top portion of the second adapter member to accommodate a container handle. The second adapter member further includes a tapered portion intermediate the first and second portions The tapered portion defines a beveled seating surface inside the second adapter member for supporting a bottom portion of the container.

If the size of the container is substantially smaller than the size of the receptacle, the bottom portion of the second adapter member is configured to fit inside the first adapter member. The second portion of the second adapter member is configured to accommodate the container such that the container fits snugly inside the second portion of the second adapter member. In this case, the first portion of the second adapter member is enlarged with respect to t e second portion thereof. A tapered portion is located intermediate the first and second portions.

BRIEF DESCRIPTION OF THE DRAWINGS

FIG. 5 is an elevational view, illustrating a container being retained in a substantially upright position by the adapter of FIG. 4;

FIG. 6 is a sectional view, taken along the line 6—6 of FIG. 5; and

FIG. 7 is a perspective view of a third embodiment of a container adapter, according to the present invention.

DETAILED DESCRIPTION OF THE PREFERRED EMBODIMENT

Figure 1:
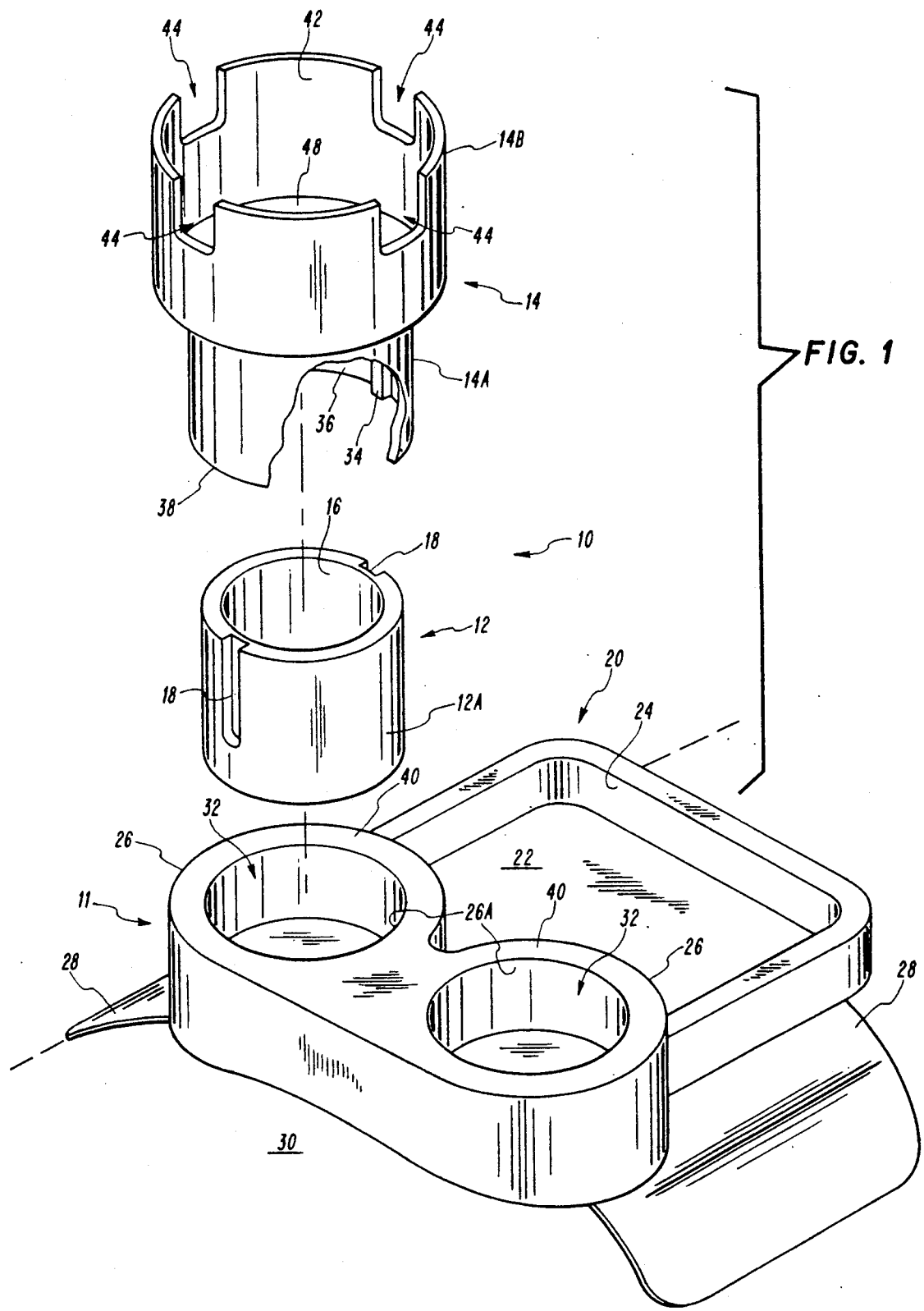
FIG. 1 is an exploded perspective view of a container adapter according to the present invention.

In the description which follows, like parts are marked throughout the specification and drawings with the same respective reference numerals. The drawings are not necessarily to scale and in some instances proportions may have been exaggerated in order to more clearly depict certain features of the invention.

Figure 2:
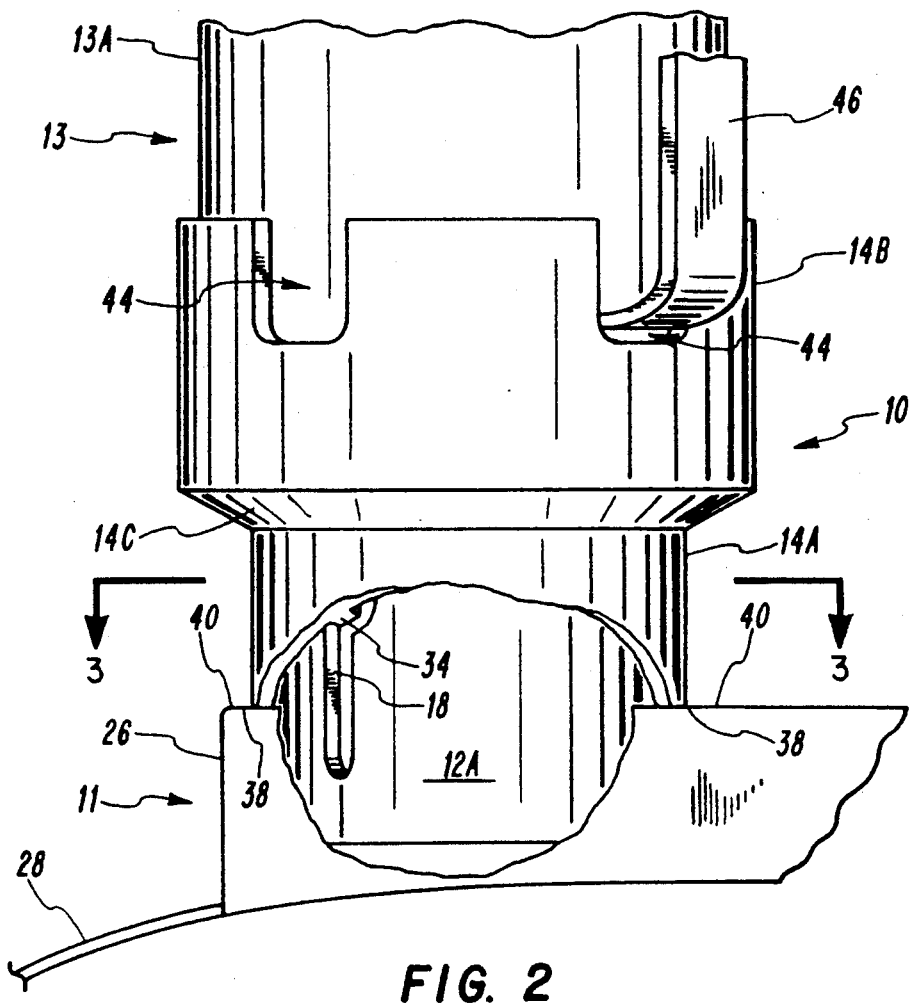
FIG. 2 is a partial elevational view, illustrating a container being retained in a substantially upright position by the container adapter of FIG. 1, a portion of the container adapter being broken away to show the interior thereof.
Figure 3:
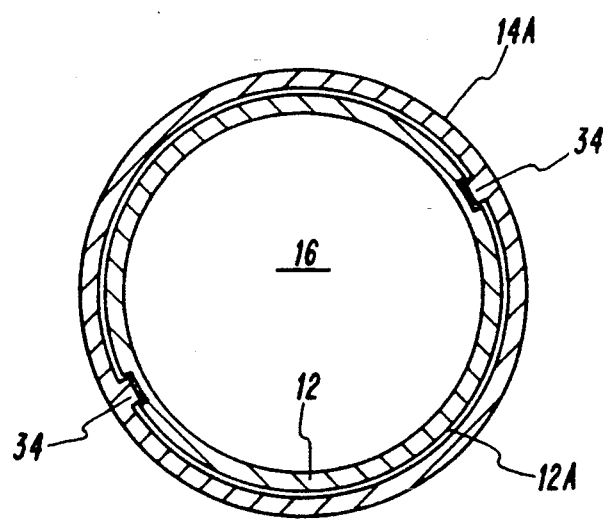
FIG. 3 is a sectional view, taken along the line 3—3 of FIG. 2.

Referring to FIGS. 1-3, an adapter 10 is provided for adapting a container holder 11 to support a substantially cylindrical container 13 in a substantially upright position. Container 13 may be a large size beverage container. Adapter 10 includes a first adapter member 12 and a second adapter member 14, both of which are preferably manufactured from a lightweight plastic material. First adapter member 12 has a substantially cylindrical shape with a top opening 16. A pair of diametrically opposed slots 18 are located on an outer surface 12a of first adapter member 12.

Container holder 11 includes a tray 20 having a relatively flat inner surface 22 surrounded by a wall 24 and a pair of substantially cylindrical receptacles 26. Tray 20 further includes a curved base member 28, which is adapted to fit over raised portion 30 of an automobile floor. Each receptacle 26 has an open mouth 32 through which items ar inserted into the corresponding receptacle 26.

The outside diameter of first adapter member 12, as measured between diametrically opposed points on outer surface 12a (excluding slots 18), is somewhat smaller than the inside diameter of each receptacle 26, as measured between diametrically opposed points on inner surface 26a of the corresponding receptacle 26. First adapter member 12 is insertable into either one of the receptacles 26 such that first adapter member 12 is retained in relatively snug fit engagement within the corresponding receptacle 26, as can be best seen FIG. 2.

Second adapter member 14 includes a cylindrical bottom portion 14a and a cylindrical top portion 14b, which is enlarged with respect to bottom portion 14a. Bottom portion 14a has a pair of rib members 34 projecting from an inner surface 36 of bottom portion 14a. Rib members 34 are in diametrically opposed relationship such that rib members 34 are adapted for mating engagement with respective slots 18 when bottom portion 14a is in mating engagement with first adapter member 12, as can be best seen in FIG. 3, to locate first adapter member 12 with respect to second adapter member 14 and to secure first adapter member 12 against rotation relative to second adapter member 14.

The inside diameter of bottom portion 14a, as measured between diametrically opposed points on inner surface 36 (excluding ribs 34), is somewhat larger than the outside diameter of first adapter member 12, such that first adapter member 12 is adapted for relatively snug fit mating engagement with bottom portion 14a.

The assembled adapter 10 is shown in FIG. 2. First adapter member 12 is in mating engagement with both receptacle 26 and bottom portion 14a of second adapter member 14. Bottom edge 38 of bottom portion 14a is in contact with top surface 40 of receptacle 26. The inside diameter of top portion 14b, as measured between diametrically opposed points on inner surface 42 of top portion 14b, is somewhat larger than the outside diameter of container 12, as measured between diametrically opposed points on an outer surface 13a of container 13, such that top portion 14b is adapted to receive a bottom part of container 13 in snug fit mating engagement, as can best seen in FIG. 2. Top portion 14b includes a plurality of notches 44, each of which is adapted to receive a handle 46, which projects outwardly from outer surface 13a. Second adapter member 14 further includes a conical portion 14c intermediate bottom and top portions 14a and 14b, which tapers upwardly and outwardly between bottom portion 14a and top portion 14b, to define a transition between respective bottom and top portions 14a and 14b. Conical portion 14c defines a beveled seating surface 48 in the interior of top portion 14b for supporting the bottom part of container 13.

One skilled in the art will recognize that rib members 34 and slots 18 are interchangeable, such that rib members 34 may be located on outer surface 12a of first adapter member 12 and slots 18 may be located on inner surface 36 of bottom portion 14a.

The configuration shown in FIGS. 1-3 is adapted for substantially cylindrical containers 13 having outside diameters greater than the inside diameter of receptacle 26, such that the container 13 cannot fit directly into receptacle 26. The diameter of first adapter member 12 depends upon the diameter of receptacle 26 and is preferably the same regardless of the size of container 13. By the same token, the diameter of bottom portion 14a of second adapter member 14 also depends on the diameter of receptacle 26 because bottom portion 14a is configured for mating engagement with first adapter member 12. Since top portion 14b of second adapter member 14 is configured to receive container 13, the size of top portion 14b depends on the container diameter. Therefore, the user need only change second adapter member 14 in order to accommodate containers of various sizes and diameters. In order to accommodate containers of various sizes and diameters, adapter 10 should include a plurality of second adapter members 14, each of which has a different sized top portion 14b according to the different sizes of the containers to be retained.

Figure 4:
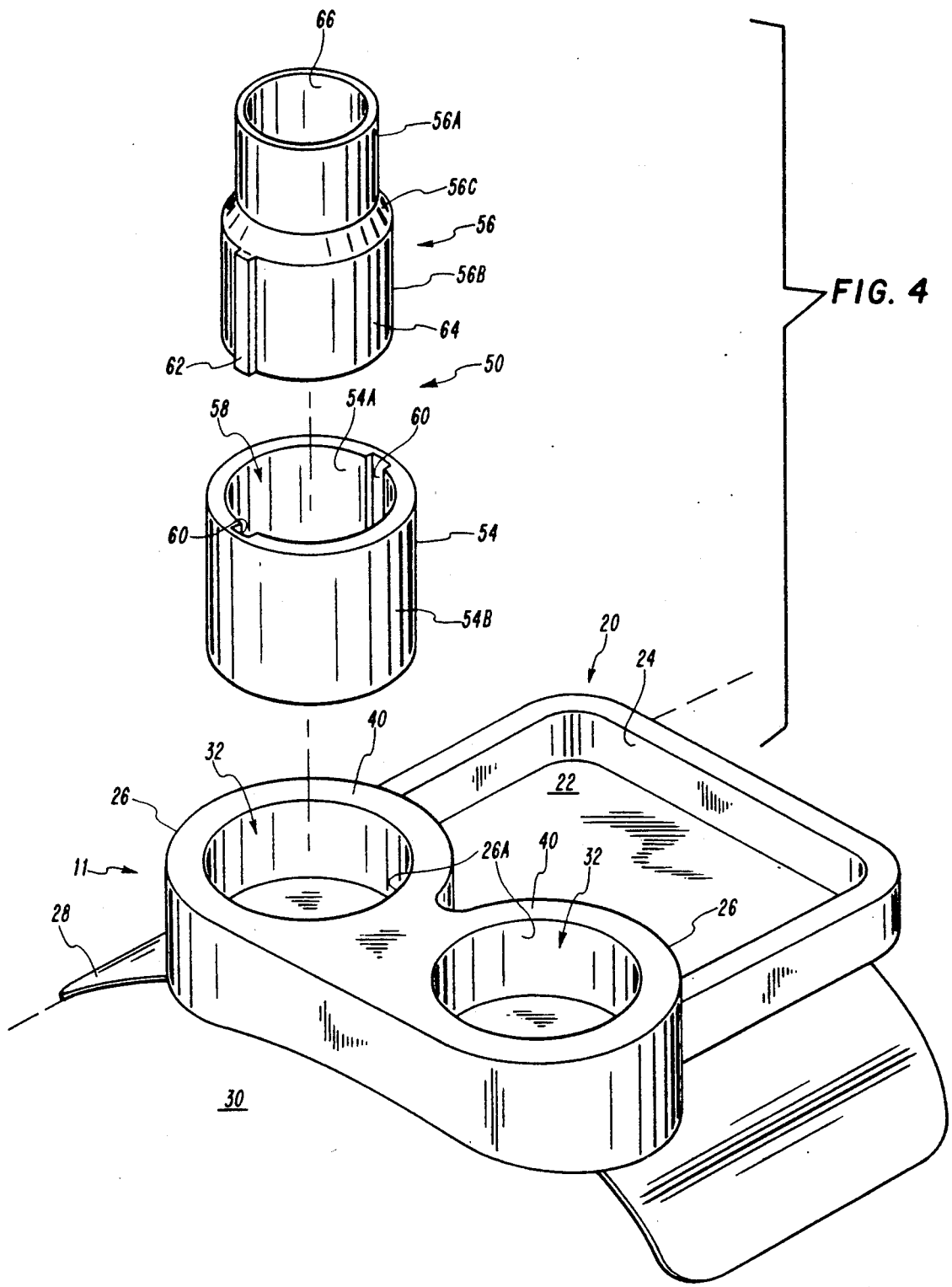
FIG. 4 is an exploded perspective view of an alternate embodiment of a container adapter, according to the present invention.

Referring to FIGS. 4-6, a second embodiment of an adapter 50 is provided to accommodate rounded containers which are substantially smaller than the size of receptacle 26. As shown in FIG. 5, such containers may include a conical shaped container 52, the diameter of which tapers downwardly from a top edge 52a thereof. Container 52 may be a disposable paper drinking cup. Adapter 50 includes a first adapter member 54 and a second adapter member 56. First adapter member 54 is substantially cylindrical and includes a top opening 58.

Two diametrically opposed slots 60 are formed in an inner surface 54a of first adapter member 54.

Second adapter member 56 includes substantially cylindrical top and bottom portions 56a and 56b, respectively, with a conical portion 56c intermediate respective top and bottom portions 56a and 56b. Conical portion 56c is tapered inwardly and upwardly from bottom portion 56b to top portion 56a, to define a transition therebetween. Bottom portion 56b is therefore enlarged with respect to top portion 56a. Bottom portion 56b has a pair of diametrically opposed ribs 62 projecting from an outer surface 64 of bottom portion 56b. Ribs 62 are adapted to matingly engage respective slots 60 when bottom portion 56b is inserted through top opening 58 into first adapter member 54, as can be best seen in FIG. 5. The mating engagement between ribs 62 and the respective slots 60 locates bottom portion 56b with respect to first adapter member 54.

The outside diameter of first adapter member 54, as measured between diametrically opposed points on outer surface 54b thereof, is somewhat smaller than the inside diameter of receptacle 26, as measured between diametrically opposed points on inner surface 26a thereof. Therefore, when first adapter member 54 is inserted through top opening 32 of receptacle 26 into receptacle 26, first adapter member 54 is retained in substantially snug fit engagement within receptacle 26.

The outside diameter of bottom portion 56b (excluding ribs 62), as measured between diametrically opposed points on outer surface 64, is somewhat smaller than the inside diameter of first adapter member 54 (excluding slots 60), as measured between diametrically opposed points on inner surface 54a. Therefore, when bottom portion 56b is inserted through top opening 58 into first adapter member 54, bottom portion 56b is retained in snug fit engagement with first adapter member 54. The mating engagement between ribs 62 and the respective slots 60 locates second adapter member 56 with respect to first adapter member 54 and secures second adapter member 56 against rotation with respect to first adapter member 54.

The assembled adapter 50 is shown in FIG. 5. First adapter member 54 is in relatively snug fit engagement with both receptacle 26 and bottom portion 56b of second adapter member 56. The inside diameter of top portion 56a, as measured between diametrically opposed points on inner surface 66 thereof, is somewhat larger than the outside diameter of at least a portion of container 52, as measured between diametrically opposed points on an outer surface 52b of container 52, such that at least a portion of container 52 can be received in top portion 56a. A portion of container 52 adjacent to top rim 52a has a substantially greater diameter than the inside diameter of top portion 56a so that a portion of container 52 extends above top portion 56a, to facilitate handling of the cup.

One skilled in the art will recognize that slots 60 and rib members 62 can be interchanged, such that slots 60 can be formed on outer surface 64 of bottom portion 56b and rib members 62 can be formed on inner surface 54a of first adapter member 54.

The configuration of first adapter member 54 depends upon the size of receptacle 26, rather than the size of container 52, such that the configuration of first adapter member 54 remains the same regardless of the size of container 52. Similarly, bottom portion 56b is also configured according to the size of receptacle 26, so that bottom portion 56b can be received in snug fit mating engagement with first adapter member 54. However, top portion 56a is configured according to the size and shape of container 52. Conical-shaped containers of different sizes may not require different top portions 56a because of the different diameters associated with different portions of the conical-shaped containers. If different top portions 56a are required, adapter 50 would include a plurality of second adapter members 56 having respective top portions 56a which are sized to accommodate selected containers of various sizes.

In accordance with another unique feature of the invention, as shown in FIG. 7, a first adapter member 68 may be configured to include a pair of diametrically opposed slots 70 on an inner surface 68a thereof and a pair of diametrically opposed slots 72 on an outer surface 68b thereof. First adapter member 68 is therefore configured to be used in either the embodiment shown in FIGS. 1-3 or the embodiment shown in FIGS. 4-6. In the embodiment shown in FIGS. 1-3, first adapter member 12 is inserted into bottom portion 14a of second adapter member 14. If first adapter member 68 were used in this configuration, outer slots 72 would matingly engage respective rib members 34 on the inner surface of bottom portion 14a. On the other hand, if first adapter member 68 were used in the embodiment shown in FIGS. 4-6, bottom portion 56b would be inserted into first adapter member 54. Therefore, if first adapter member 68 were used in the embodiment shown in FIGS. 4-6 inner slots 70 would matingly receive the respective ribs 62 located on outer surface 64 of bottom portion 56b. First adapter member 68 can therefore be used irrespective of whether the particular container being supported is substantially larger than or substantially smaller than the corresponding receptacle 26.

In accordance with the present invention, an adapter is provided for supporting containers of various sizes in a substantially upright position. The adapter is interposed between a conventional beverage container holder and the beverage container itself for supporting the beverage container in a relatively stable upright position. The adapter can be configured for containers of various sizes.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims

What is claimed is:

1. An adapter for adapting a container to be supported by a container holder in a relatively upright position, the container holder having as cylindrically-shaped receptacle with a predetermined inner diameter, said adapter comprising:

a first adapter member having a first portion adapted for mating engagement with the receptacle and a second portion extending outwardly from the receptacle when said first portion is in mating engagement with the receptacle, said first adapter member being substantially cylindrically-shaped and having an outer diameter which is somewhat smaller than the inner diameter of the receptacle such that said first portion of said first adapter member is in relatively snug fit engagement with the receptacle when said first adapter member is in mating engagement with the receptacle;

a second adapter member having a first portion adapted for mating engagement with the container and a second portion adapted for mating engagement with said second portion of said first adapter member, said first portion of said second adapter member being substantially cylindrical for receiving a bottom portion of the container, said second portion of said second adapter member being substantially cylindrical and having an outer diameter which is somewhat less than an inner diameter of said first adapter member such that said second portion of said first adapter member is positionable in concentric relation about said second portion of said second adapter member, said second portion of said second adapter member being enlarged with respect to said first portion of said second adapter member such that said first portion of said second adapter member is adapted to support a container having an outer diameter which is substantially smaller than the inner diameter of the receptacle;

at least one male member located on one of said second portion of said first adapter member and said second portion of said second adapter member; and at least one female member located on the other one of said second portion of said first adapter member and said second portion of said second adapter member, said at least one female member being adapted for mating engagement with said at least one male member for locating said second adapter with respect to said first adapter member.

2. The adapter of claim 1 wherein said at least one male member is located on said second portion of said second adapter member and at least one female member is located on said second portion of said first adapter member.

3. The adapter of claim 2 wherein said at least one male member includes a plurality of rib members projecting from an outer surface of said second portion of said second adapter member, said at least one female member including a corresponding plurality of slots located on an inner surface of said second portion of said first adapter member, each of said slots being adapted for mating engagement with a corresponding one of said rib members when said second adapter member is in mating engagement with said first adapter member.

4. The adapter of claim 1 wherein said first portion of said second adapter member has at least one notch to accommodate a container handle.

5. The adapter of claim 1 wherein said second adapter member further includes a third portion intermediate said first and second portions of said second adapter member, said third portion having a substantially conical shape to define a transition between said first and second portions of said second adapter member.

6. An adapter for adapting a container to be supported by a container holder in a relatively upright position, the container holder having a receptacle, said adapter comprising:

a first adapter member having a first portion adapted for mating engagement with the receptacle and a second portion extending outwardly from the receptacle when said first portion of said first adapter member is in mating engagement with the receptacle;

a second adapter member having a first portion adapted for mating engagement with the container and a second portion adapted for mating engagement with said second portion of said first adapter member;

at least one male member located on said second portion of said second adapter member; and a plurality of female members located on said second portion of said first adapter member, at least one of said female members being located on an outer surface of said second portion of said first adapter member and at least another one of said female members being located on an inner surface of said second portion of said first adapter member, such that at least one of said female members is adapted for mating engagement with a male member located on said second portion of said second adapter member, irrespective of whether said male member is located on an outer surface or an inner surface of said second portion of said second adapter member.

7. The adapter of claim 6 wherein said plurality of female members include a corresponding plurality of elongated slots.

8. The adapter of claim 7 wherein said plurality of slots includes at least four slots, at least two of said slots being formed in said outer surface of said first adapter member and at least two of said slots being formed in said inner surface of said first adapter member.

9. The adapter of claim 8 wherein said first adapter member has a substantially cylindrical shape, said at least two of said slots formed in said outer surface of said first adapter member being located in diametrically opposed relationship and said at least two of said slots formed in said inner surface of said first adapter member being located in diametrically opposed relationship.

10. Apparatus for supporting a container in a relatively upright position, said apparatus comprising, in combination:

a container holder having a substantially cylindrical receptacle with a predetermined inner diameter; and an adapter for adapting the container holder to support the container in the relatively upright position, said adapter comprising:

a first adapter member having a first portion adapted for mating engagement with the receptacle and a second portion extending outwardly from the receptacle when said first portion is in mating engagement with the receptacle, said first adapter member being substantially cylindrically-shaped and having an outer diameter which is somewhat smaller than the inner diameter of the receptacle such that said first portion of said first adapter member is in relatively snug fit engagement with the receptacle when said first adapter member is in mating engagement with the receptacle;

a second adapter member having a first portion adapted for mating engagement with the container and a second portion adapted for mating engagement with said second portion of said first adapter member, said first portion of said second adapter member being substantially cylindrical for receiving a bottom portion of the container, said second portion of said second adapter member being substantially cylindrical and having an outer diameter which is somewhat less than an inner diameter of said first adapter member such that said second portion of said first adapter member is positionable in concentric relation about said second portion of said second adapter member, said second portion of said second adapter member being enlarged with respect to said first portion of said second adapter member such that said first portion of said second adapter member is adapted to support a container having an outer diameter which is substantially smaller than the inner diameter of the receptacle;

at least one male member located on one of said second portion of said first adapter member and said second portion of said second adapter member; and at least one female member located on the other one of said second portion of said first adapter member and said second portion of said second adapter member, said at least one female member being adapted for mating engagement with said at least one male member for locating said second adapter with respect to said first adapter member.

* * * * *